United States Patent [19]
Nakahara

[11] Patent Number: 6,021,217
[45] Date of Patent: Feb. 1, 2000

[54] IMAGE PROCESSING METHOD AND PRINTER

[75] Inventor: Nobuhiko Nakahara, Shizuoka-ken, Japan

[73] Assignee: Toshiba Tec Kabushiki Kaisha, Tokyo, Japan

[21] Appl. No.: 09/172,530

[22] Filed: Oct. 14, 1998

[30] Foreign Application Priority Data

Oct. 17, 1997 [JP] Japan .................................... 9-284876
Sep. 30, 1998 [JP] Japan .................................. 10-279013

[51] Int. Cl.$^7$ .............................. G06K 9/00; G06K 9/38; H04N 1/40
[52] U.S. Cl. ........................ 382/169; 358/456; 358/457; 358/466; 382/270
[58] Field of Search ..................................... 358/455, 456, 358/429, 457, 465, 466, 534, 535, 536; 382/169, 172, 270

[56] References Cited

U.S. PATENT DOCUMENTS

| | | | |
|---|---|---|---|
| 5,315,669 | 5/1994 | Kumagai | 382/50 |
| 5,422,742 | 6/1995 | Ostromoukhov et al. | 358/536 |
| 5,444,551 | 8/1995 | Miller et al. | 358/456 |
| 5,715,081 | 2/1998 | Chastang et al. | 359/385 |

*Primary Examiner*—Jerome Grant, II
*Attorney, Agent, or Firm*—Frishauf, Holtz, Goodman, Langer & Chick, P.C.

[57] ABSTRACT

In case of subjecting input graduation image data of 8 bits per pixel to multilevel dither processing, to convert them into image data having gradients of 3 bits per pixel on the basis of dither threshold planes, in a combination of threshold arrays extending over the plural dither threshold planes, dither thresholds for raising spatial fre0 quency, as shown in FIG. 8A, are arranged in low density areas of the input graduation image data, and dither thresholds for making spatial frequency lower than that in the low density areas, as shown in FIG. 8C, are arranged in half tone areas and high density areas of the input graduation image data.

7 Claims, 10 Drawing Sheets

| THRESHOLD PLANE | PIXEL NO. | | | | | | | |
|---|---|---|---|---|---|---|---|---|
| | 1 | 2 | 3 | 4 | 5 | 6 | 7 | 8 |
| 1 | 1 | 2 | 3 | 4 | 5 | 6 | 7 | 8 |
| 2 | 9 | 10 | 11 | 12 | 13 | 14 | 15 | 16 |
| 3 | 17 | 18 | 19 | 20 | 21 | 22 | 23 | 24 |
| 4 | 25 | 26 | 27 | 28 | 29 | 30 | 31 | 32 |
| 5 | 33 | 34 | 35 | 36 | 37 | 38 | 39 | 40 |
| 6 | 41 | 42 | 43 | 44 | 45 | 46 | 47 | 48 |
| 7 | 49 | 50 | 51 | 52 | 53 | 54 | 55 | 56 |

FIG. 8A

| THRESHOLD PLANE | PIXEL NO. | | | | | | | |
|---|---|---|---|---|---|---|---|---|
| | 1 | 2 | 3 | 4 | 5 | 6 | 7 | 8 |
| 1 | 1 | 8 | 15 | 22 | 29 | 36 | 43 | 50 |
| 2 | 2 | 9 | 16 | 23 | 30 | 37 | 44 | 51 |
| 3 | 3 | 10 | 17 | 24 | 31 | 38 | 45 | 52 |
| 4 | 4 | 11 | 18 | 25 | 32 | 39 | 46 | 53 |
| 5 | 5 | 12 | 19 | 26 | 33 | 40 | 47 | 54 |
| 6 | 6 | 13 | 20 | 27 | 34 | 41 | 48 | 55 |
| 7 | 7 | 14 | 21 | 28 | 35 | 42 | 49 | 56 |

FIG. 8B

| THRESHOLD PLANE | PIXEL NO. | | | | | | | |
|---|---|---|---|---|---|---|---|---|
| | 1 | 2 | 3 | 4 | 5 | 6 | 7 | 8 |
| 1 | 1 | 2 | 3 | 4 | 5 | 6 | 7 | 8 |
| 2 | 9 | 10 | 11 | 13 | 15 | 18 | 21 | 25 |
| 3 | 12 | 14 | 16 | 19 | 22 | 26 | 29 | 33 |
| 4 | 17 | 20 | 23 | 27 | 30 | 34 | 37 | 41 |
| 5 | 24 | 28 | 31 | 35 | 38 | 42 | 45 | 48 |
| 6 | 32 | 36 | 39 | 43 | 46 | 49 | 51 | 53 |
| 7 | 40 | 44 | 47 | 50 | 52 | 54 | 55 | 56 |

```
              PIXEL NO.
              1  2  3  4  5  6  7  8
           1| 1  2  3  4  5  6  7  8
THRESHOLD  2| 9 10 11 13 15 17 20 23
  PLANE    3|12 14 16 19 22 25 28 31
           4|18 21 24 27 30 33 36 39
           5|26 29 32 35 38 41 44 47
           6|34 37 40 43 46 49 51 53
           7|42 45 48 50 52 54 55 56
```

FIG. 11

```
              PIXEL NO.
              1  2  3  4  5  6  7  8
           1| 1  2  3  4  5  6  7  8
THRESHOLD  2| 9 11 14 18 23 29 35 41
  PLANE    3|10 13 17 22 28 34 40 46
           4|12 16 21 27 33 39 45 50
           5|15 20 26 32 38 44 49 53
           6|19 25 31 37 43 48 52 55
           7|24 30 36 42 47 51 54 56
```

FIG. 12

```
              PIXEL NO.
              1  2  3  4  5  6  7  8
           1| 1  2  3  4  5  6  7  8
THRESHOLD  2| 9 10 12 14 17 20 24 28
  PLANE    3|11 13 16 19 23 27 32 36
           4|15 18 22 26 31 35 40 44
           5|21 25 30 34 39 43 47 50
           6|29 33 38 42 46 49 52 54
           7|37 41 45 48 51 53 55 56
```

IMAGE PROCESSING METHOD AND PRINTER

BACKGROUND OF THE INVENTION

The present invention relates to an image processing method and a printer for subjecting multilevel input image data to multilevel dither processing, so as to convert them into image data having a smaller number of gradients.

Hitherto, in an image forming device using a line head, such as a line LED (light emitting diode) head, a line thermal head or a line ink jet head, bi-level images have been formed by printing dots having the same size on a printing paper, with resolution of the head, that is, at intervals along the raster direction of plural LEDs, which are plural printing elements arranged in a line form, in case of the line LED head, at intervals along the raster direction of plural heating resistors, which are plural printing elements arranged in a line form, in case of the line thermal head, or at intervals along the raster direction of plural ink jetting nozzles, which are printing elements arranged in a line form, in case of the line ink jet head.

In such image forming devices, any character image is simply reproduced as an bi-level image corresponding to resolution of the head. Any photographic image is reproduced by halftone processing such as a systematic dither method or an error diffusion method. In such halftone processing, compatibility with maintaining high resolution and reproduction of high contrast gradients is very difficult, and in particular, in systematic dither processing, resolution is not compatible with gradients.

Figure 15:
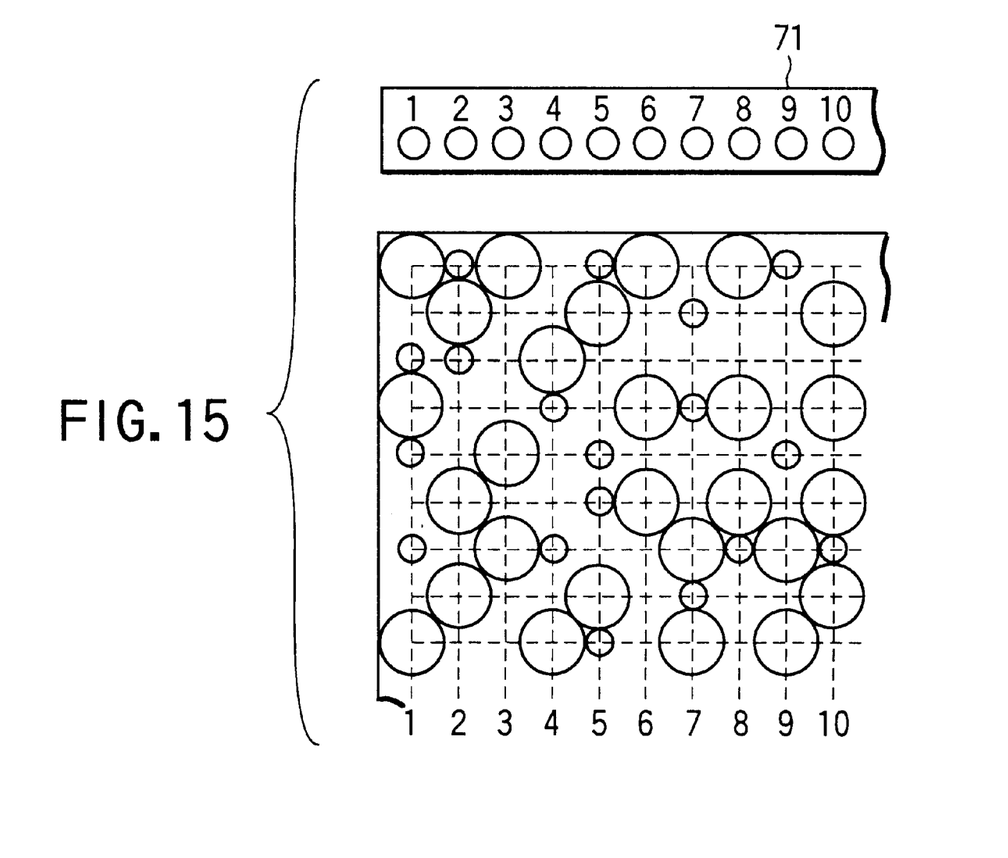
FIG. 15 is a view showing a printed matter by a line print head in the prior art.

Incidentally, in recent years, as image forming devices having such a line head, devices have been realized wherein multilevel image data are used and a print area in every pixel is modulated so that an image inside every pixel is represented at any one of several gradients (gray scales). FIG. 15 shows a print head 71 in which plural printing elements are arranged in a line form, and the state of dots printed by the print head 71. For simplification, FIG. 15 shows, as an example, a case wherein a pixel is printed at 3 levels containing a white level. By arranging the same as the print head 71 in parallel, for example, 4 or 3 lines, color images in combination of 4 colors, C(cyan), M (magenta), Y (yellow) and K (black), or 3 colors, C , M and Y can be printed.

In such image forming devices making it possible to record multilevel image data, various types of image processings, such as color convert progressing, UCR (under color removal) processing, or γ correction, are carried out. Subsequently, in order to reproduce specific gradients intrinsic to a printer engine section for carrying out actual image printing operation, multilevel halftone processing such as multilevel dither processing using a screen angle, or multilevel error diffusion processing is carried out for each color, and then multilevel image data of several bits per pixel are obtained. Image reproductibity is improved by concentrating a greater deal of information on every pixel.

A multilevel dither processing, which is one of multilevel halftone processings, is roughly classified into 2 types, dependently on a manner of distributing a threshold array extending over respective planes. The one is a method shown in FIG. 17A, in which thresholds are applied to respective plane units, in increasing order. The other is a method shown in FIG. 17B, in which thresholds are applied to any one of pixels to be processed, in increasing order.

Figure 16:
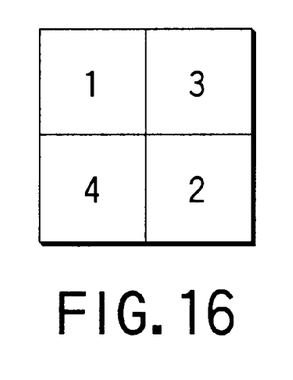
FIG. 16 is a view showing a basic dither matrix.
Figure 17A:
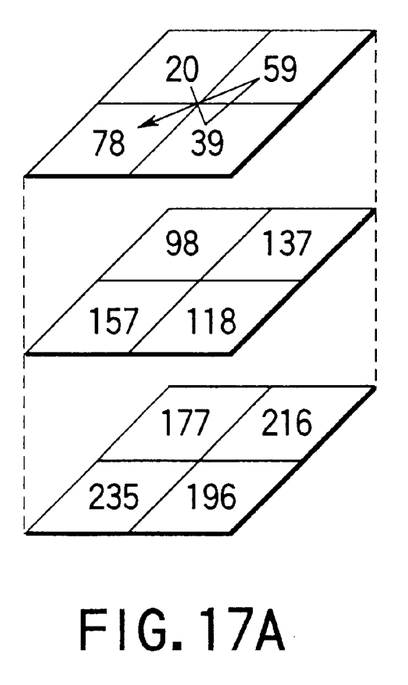
FIGS. 17A and 17B are views for explaining a conception of multilevel dither processing in the prior art, respectively.

For example, a multilevel dither processing in which input image data of 8 bits are converted into images of 4 levels (2 bits) per pixel by the method as shown in FIG. 17A using a (2×2) basic dither matrix shown in FIG. 16 is a dither processing for printers making it possible to stably reproduce an image in every independent pixel without being basically influenced by the state of emergence of a dot in any adjacent pixel, for example, ink jet printers. In this processing, resolution is substantially equal to resolution of the printer engine section, and is very high. Dot density is also high, and spatical frequency becomes highest. This processing is an ideal processing in case wherein images are reproduced by area modulation. However, an image is liable to be reproduced in the whole of a pixel by dots having the same or substantially the same sizes and, in consequence, when a gap from an ideal state is generated by influence by printing accuracy or the like, the gap becomes very visually conspicuous as deterioration of image quality.

Figure 17B:
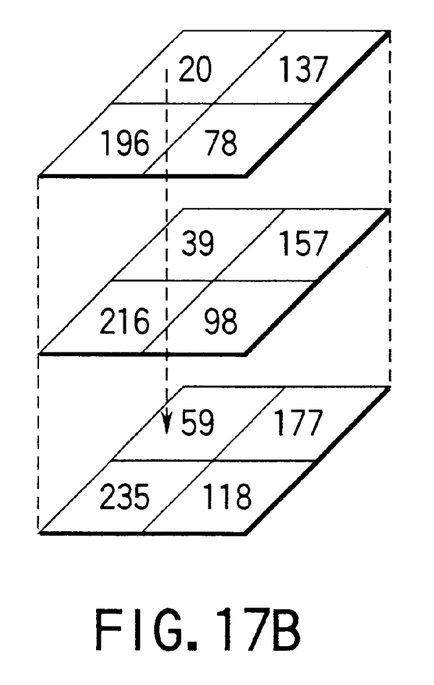

A multilevel dither processing in which input image data of 8 bits are converted into images of 4 levels (2 bits) per pixel by the method as shown in FIG. 17B using a (2×2) basic dither matrix shown in FIG. 16 is a dither processing which is frequently used for printers causing image formation based on independent pixels to be difficult and unstable, with being easily influenced by the state of emergence of a dot in any adjacent pixel, for example, laser printers and thermal printers. In this processing, the resolution of each image is low, and the dot density in the image is also low. The spatical frequency decreases. When the basic threshold array for this dither processing is made into a fattening type, an image called a dot screen dot is formed. Since the resolution is low, slight printing unevenness in every pixel unit is canceled.

Incidentally, concerning the relationship between a print head and printing accuracy about a print position, a print size and the like, for example in case of ink jet printers, the volume or the direction of ink jetted out from their ink jetting nozzles is frequently scattered dependently on the particular ink jetting nozzle. It is possible to suppress the scattering to such a level that any problems do not arise, but in that case manufacturing costs become very high. However, if the problem of the scattering is not solved, in dots from ink jetting nozzles having a large inner diameter or adjacent dots which are very close, their density becomes high and a black stripe arises while in dots from ink jet nozzles having a small inner diameter or adjacent dots which are apart, their density becomes low and unevenness arises, for example, a white line arises. Thus, the image quality deteriorates.

Thus, originally it is ideal that halftone processing is carried out by the multilevel dither processing shown in FIG. 17A. However, this processing has problems that the processing is easily influenced by printing accuracy and that density unevenness and lengthwise lines arise. Thus, it is worth taking it into account that halftone processing is carried out by the multilevel dither processing shown in FIG. 17B and further deterioration such as density unevenness and vertical stripes is prevented as much as possible. In this method, however, resolution drops to a level corresponding to the basic matrix size unit. Thus, in case wherein original resolution is low, pixels themselves become visually conspicuous and the image quality deteriorates.

BRIEF SUMMARY OF THE INVENTION

An object of the present invention is to provide an image processing method making it possible to suppress influence on printing accuracy by density unevenness, vertical stripes and the like with resolution being kept at a maximum level, and suppress graininess in low density areas of images by applying a dither threshold array making spatial frequency higher in the low density area.

Another object of the present invention is to provide a printer making it possible to suppress influence on printing accuracy by density unevenness, vertical stripes and the like with resolution being kept at a maximum level, and suppress graininess in low density areas of images by applying a dither threshold array making spatial frequency higher in the low density area.

According to the present invention, provided is a image processing method, comprising the step of subjecting input graduation image data of M bits per pixel to multilevel dither processing on the basis of plural dither threshold planes, so as to convert them into image data of N (M>N) bits per pixels, having a smaller number of gradients, in which, in a dither threshold array between basic thresholds of a dither matrix and the plural dither threshold planes, the dither threshold arrays therein are in sequence and regularly arranged with an inclination having an oblique angle, so as to extend over the plural dither threshold planes.

According to this image processing method, it is possible to suppress influence on printing accuracy by density unevenness, vertical stripe, and the like with resolution being at a maximum level.

According to the present invention, provided is also a printer, comprising: a processing means wherein, when subjecting input graduation image data of M bits per pixel to multilevel dither processing on the basis of plural dither threshold planes, so as to convert them into image data of N (M>N) bits per pixels, having a smaller number of gradients, in a dither threshold array between basic thresholds of a dither matrix and the plural dither plane, dither thresholds therein are in sequence and regularly arranged with an inclination having an oblique angle, so as to extend over the plural dither threshold planes; and a printing means for printing on the basis of the image data of N bits outputted from the image processing means.

According to this printer, it is possible to suppress influence on printing accuracy by density unevenness, vertical stripe, and the like with resolution being at a maximum level.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will be described referring to the attached drawings. The present embodiment is an embodiment wherein the present invention is applied to a color ink jet printer.

Figure 1:
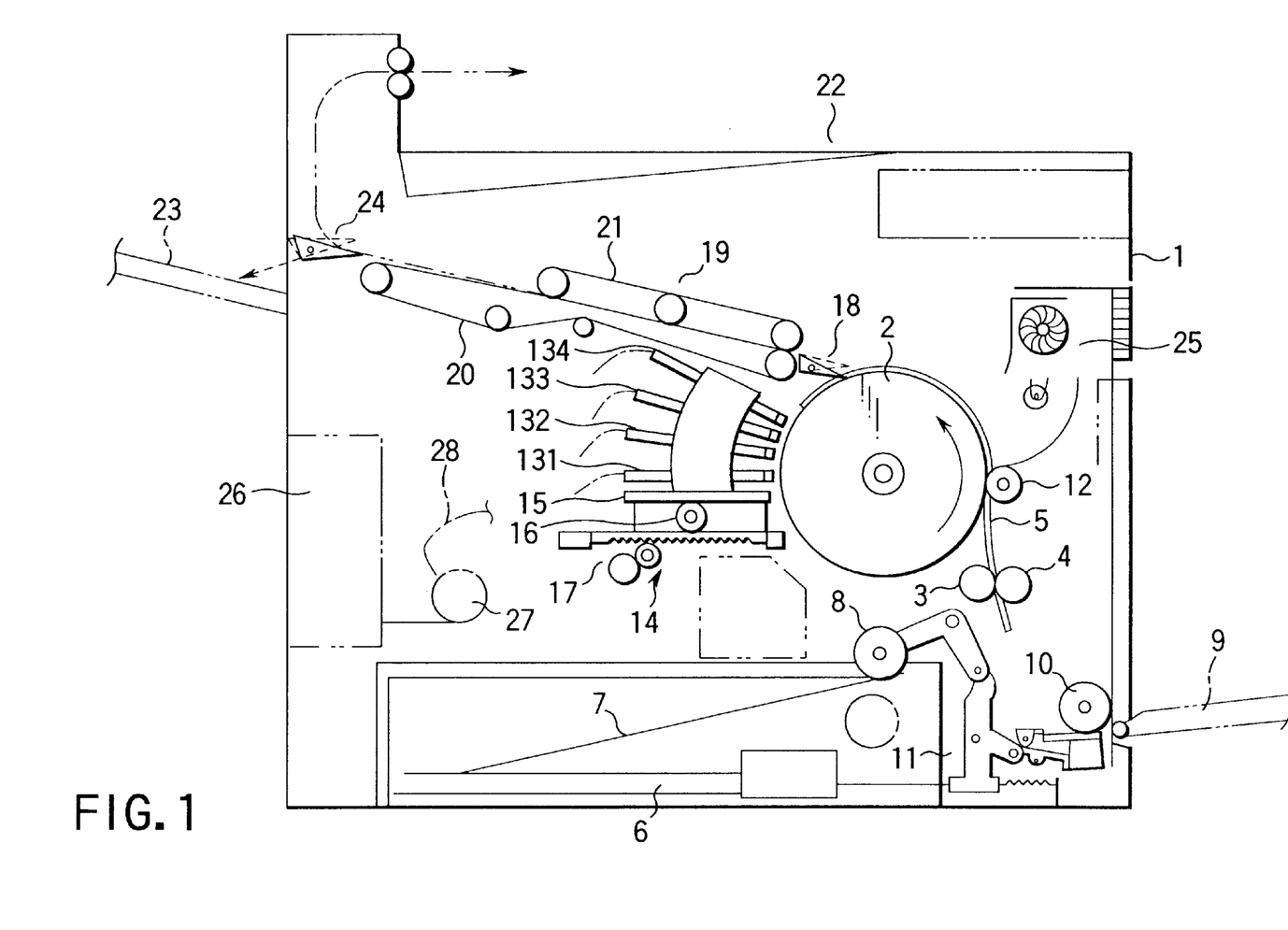
FIG. 1 is a view of essential components of the whole of a printer of an embodiment of the present invention.

FIG. 1 is a view showing essential components of the whole of the printer. Inside a body case 1, a rotating drum 2 which can rotate at a constant rotating speed in the direction shown by an arrow in this view is disposed, and a printing paper 5 carried by paper feeding rollers 3 and 4 can be wound around the rotating drum 2.

Specifically, a paper feeding cassette 6 is disposed at the bottom of the body case 1, and the printing papers 5 are stacked on a stacking plate 7 of the paper feeding cassette 6. The stacked printing papers 5 are taken out one by one by a paper feeding roller 8 so as to feed them into the paper feeding rollers 3 and 4. Besides, from a tray 9 for inserting a paper by hand fitted to the side of the body case 1 to be freely opened and closed, the printing paper 5 inserted by hand can be fed into the paper feeding rollers 3 and 4 by a paper feeding roller 10. Switching the paper-to-feeding by the paper feeding roller 8 and that by the paper feeding roller 10 is carried out by a paper feeding switching means 11.

A charging roller 12 for adsorbing the printing paper 5 fed from the paper feeding rollers 3 and 4 onto the face of the drum is arranged oppositely to the rotating drum 2. Also, oppositely to the rotating drum 2, a printing mechanism 14 is arranged, wherein 4 ink jet print heads 131, 132, 133 and 134 having a lot of printing elements arranged in a form of lines are arranged to freely move along the rotary axial of the rotating drum 2. The respective print heads 131 to 134 are a yellow ink jet print head 131 for jetting yellow (Y) ink, a cyan ink jet print head 132 for jetting cyan (C) ink, a magenta ink jet print head 133 for jetting magenta (M) ink, and a black ink jet print head 134 for jetting black (K) ink, respectively.

The printing mechanism 14 is composed of a reciprocating mechanism 15 on which the print heads 131 and 134 are put, a motor unit 16 having a reciprocating rod and a linear motor, and a forward and backward moving means 17. By the forward and backward moving means 17, the print heads 131 to 134 can be moved forward to and backward from the rotating drum 2, and further by the motor unit 16 the reciprocating mechanism 15 is controlled and moved along the rotary axial of the rotating drum 2, so that the print heads 131 to 134 can be reciprocated along the rotary axial of the rotating drum 2.

At the rotating drum 2, a printing paper exfoliating means having a exfoliating claw 18 which can be inserted between the surface of the drum 2 and the printing paper 5 is arranged, so that the printing paper 5 exfoliated by means of the exfoliating claw 18 can be discharged to a printing paper discharging/carrying means 19. This means 19 is composed of a belt conveyer 20 contacting the non-to-printed surface of the printing paper 5, and a pressing means 21 for pressing the printing paper 5 against of surface of the belt conveyer 20.

The end portion of the belt conveyer 20 is furnished with a direction switching means 24 for switching whether the printing paper 5 carried by the belt conveyer 20 is discharged to an upper discharging tray 22 located above the body case 1 or a discharging tray 23 fitted to the side of the body case 1 to be freely put on and taken off. Reference Numbers 25, 26, 27 and 28 designate an ink drying means, an ink cassette, an ink buffer, and an ink supplying tube, respectively.

Figure 2:
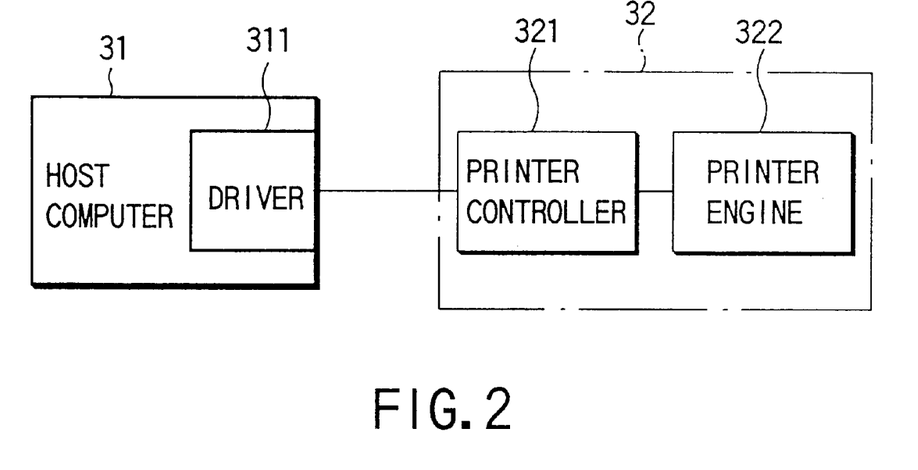
FIG. 2 is a block view showing the whole of hardware of the same embodiment.

FIG. 2 is a block view showing whole hardware components. Image data can be transferred from a host computer 31 to a printer 32. Specifically, the host computer 31 can transfer codes or raster data from a driver 311 to a printer controller 321 in the printer 32, so as to match the character of the interface with the printer 32.

In the printer 32, the printer controller 321 controls and drives a printer engine 322. The printer engine 322 is composed of the paper feeding mechanism including the rotating drum 2, the paper feeding rollers 3 and 4, and the paper feeding cassette 6, the charging roller 12, the printing mechanism 14 having the ink jet print heads 131 to 134, the printing paper discharging/carrying means 19, and the like.

The printer controller 321 spreads coded image data sent from the host computer 31, for example, a page describing language such as PDL, into a bitmap and carries out various types of image processings, and subsequently stores the data into a page memory that the printer controller 321 has therein. The printer engine 322 converts the bitmap data from the printer controller 321 into driving signals, and drives the rotating drum 2, the paper feeding mechanism, the charging roller 12, the respective print heads 131 to 134, and the like, in predetermined order.

The relationship between the host computer 31 and the printer 32 is not necessarily one to one. The printer may be connected, as a network printer, to a network which has been spread recently. In this case, the relationship is plurality to one. The interface between the printer controller 321 and the printer engine 322 basically depends on architecture of the printer, and is not standardized.

Figure 3:
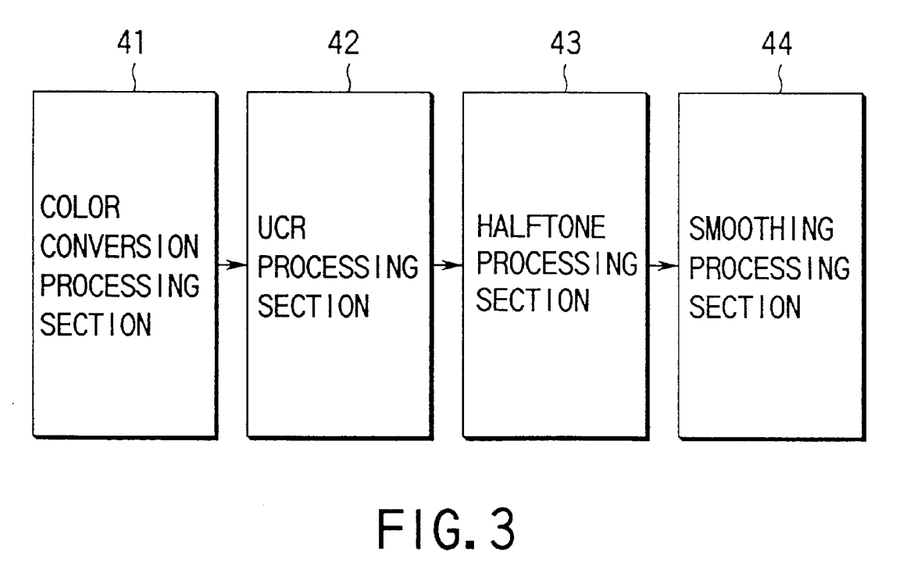
FIG. 3 is a block view showing components of an image processing section of a printer controller in the same embodiment.

FIG. 3 is a block view showing components of an image processing unit in the printer controller 321. This unit is composed of a color conversion processing section 41, an UCR processing section 42, a halftone processing unit 43, and a smoothing processing section 44. For example, inputted RGB color signals which are of 8 bits per color and are standard for monitors are first converted into CMY colors, which are reproducible colors in printers 32, in the color conversion processing section 41.

Next, in the UCR processing section 42, black components are extracted from the CMY colors, and CMY colors after that are decided. At last, the data are converted into CMYK colors. In the halftone processing section 43, by multilevel dither processing for each color, data for every pixel are compressed into data which are of about 2 to 4 bits for each color and match the printing ability of the printer 32. In the smoothing processing section 44, edge portions are corrected for each color to suppress jags of lines and images.

Figure 4:
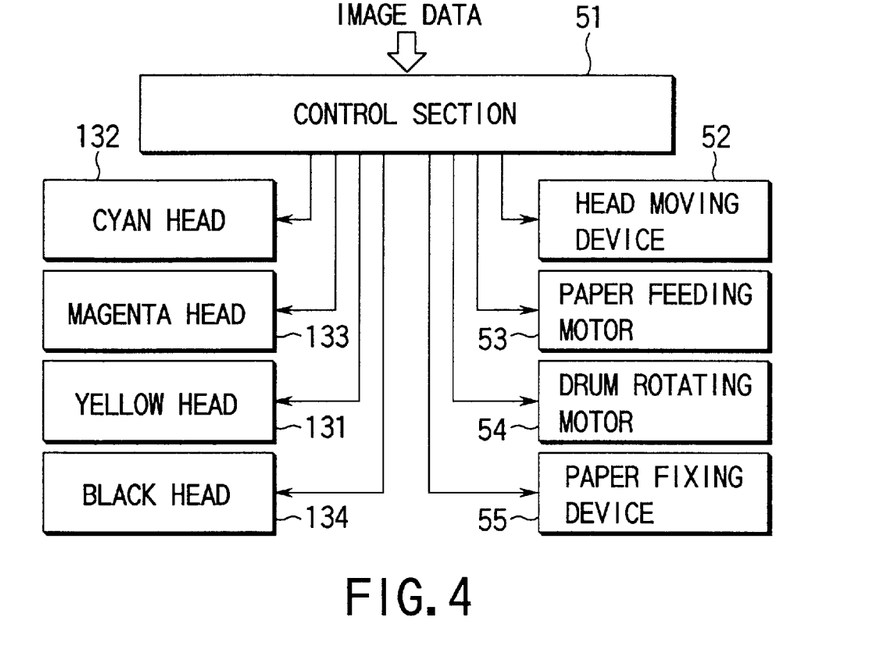
FIG. 4 is a block view showing hardware of a printer engine in the same embodiment.

FIG. 4 is a block view showing hardware components of the printer engine 322. The printer engine 322 has a control section 51, and on the basis of image data the control section 51 controls and drives the respective print heads 131 to 134, and further controls and drives a head carrying device 52 composed of the reciprocating mechanism 15 and the motor unit 16, a paper carrying motor 53 for rotating the paper feeding rollers 3 and 4, a drum rotating motor 54 for rotating the rotating drum 2, and a paper fixing device 55 composed of the charging roller 12 for fixing the carried printing paper 5 onto the rotating drum 2. The head moving device 52 moves the respective print heads 131 to 134 at given speed and timing along the rotary axial of the rotating drum 2, in synchronization with printing. The paper carrying motor 53 controls and carries the printing paper 5 picked up from the paper feeding cassette 6 to the rotating drum 2. The exfoliated printing paper 5 on which the printing has already been finished is discharged from the printing paper discharging/carrying means 19 and the like by means of another motor.

The halftone processing section 43 constitutes an essential component in the present invention. The operation of this processing section will be described, giving, as an example, a case wherein inputted image data of 8 bits and 256 gradients are subjected to halftone processing to convert them into data of 3 bits and 8 gradients for each color.

Figure 5:
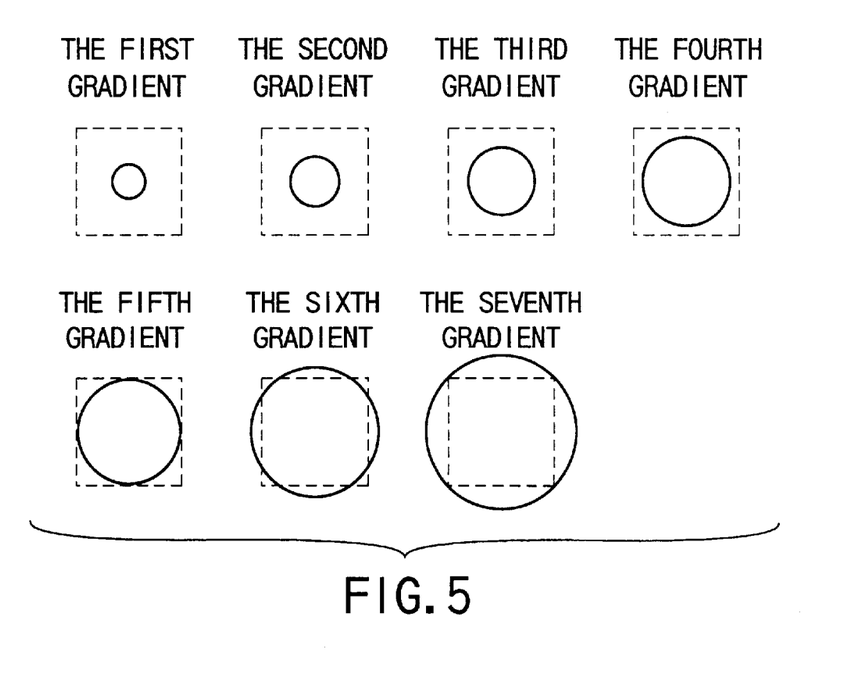
FIG. 5 is a view showing sizes of pixels having respective gradients in the same embodiment.

When the printer 32 has capability of handling images of 3 its for each color, multilevel image data of 3 bits for each color can be obtained by halftone processing. According to this, in every pixel, 8 gradients including a white level can be reproduced in total, using 7 types of variable dot sizes for each color, as shown in FIG. 5. Generally, the size of every dot of each gradient is beforehand adjusted for each color, so as to have density of a linear character. The dot size of the largest gradient, that is, the seventh gradient, is a size of a circle which can cover a square pixel corresponding to net resolution of the printer engine 32.

Figure 6A:
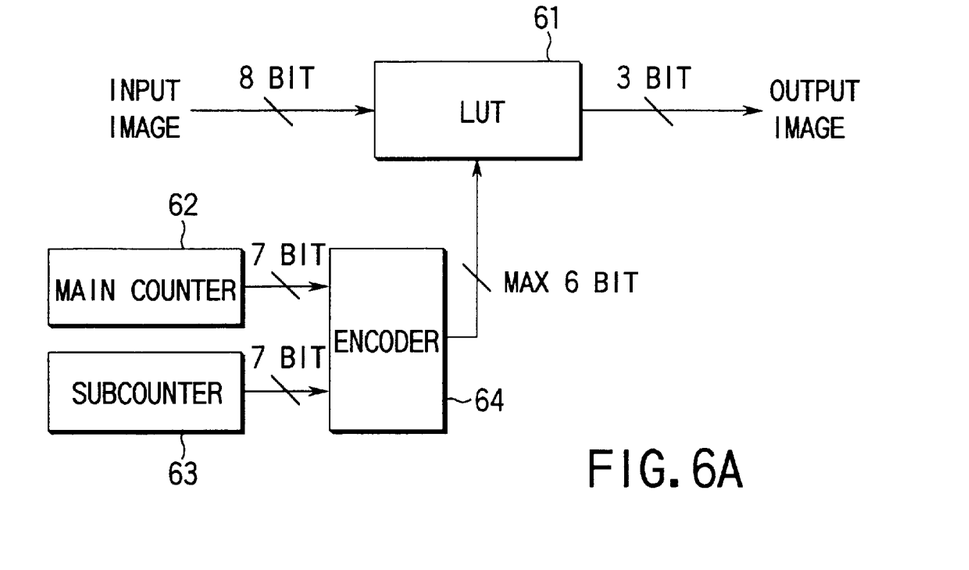
FIGS. 6A and 6B are block views showing specific components of a halftone processing section in the same embodiment, respectively.

FIG. 6A illustrates specific components of the halftone processing section 43, which is a block for carrying out multilevel dither processing. This block is composed of a LUT (look up table) 61, a main counter 62, a subcounter 63 and an encoder 64. The main counter 62 counts any constant number of bits periodically in the main scanning direction.

The size of the main counter 62 is a size in the main scanning direction of a lattice obtained by spreading the basic matrix including the screen angle into a square lattice form. The subcounter 63 counts any constant number of bits periodically in the vertical scanning direction. Its size is a size in the vertical scanning direction of a lattice obtained by spreading basic matrix including a screen angle into a square lattice form. In this embodiment, the sizes correspond to a period up to 128 pixel counts in the main scanning direction and a period up to 128 pixel counts in the vertical scanning direction.

In the encoder 64, counted values are inputted from the main counter 62 and the subcounter 63, and then on the basis of the dither threshold rows on many planes corresponding to the position based on the counted values, a certain encoded code of at maximum 6 bits is outputted. The code of at maximum 6 bits is outputted for the following reason. In case wherein inputted image data are of 8 bits and 256 gradients and after halftone processing they becomes data of 3 bits and 8 gradients, the maximum x of different thresholds making it possible that the maximum number of reproducible gradients which does not exceed 256 gradients is realized by multilevel dither processing is:

$$255/\{xx(8-1)+1\} \geq 1, \text{ that is, } x \leq 36.$$

Thus, if there are codes of at maximum 6 bits, they can cover halftone reproduction up to 256 gradients, which are necessary and sufficient for multilevel dither processing. Hardware of this encoder 64 can easily be composed of RAM and the like.

On the basis of the coded data of at maximum 6 bits and the inputted image data of 8 bits and 256 gradients, the LUT 61 outputs data resulting from conversion by actual multilevel dither processing, at a level of 3 bits and 8 gradients. Hardware of this LUT 61 can easily be composed of RAM and the like.

Figure 6B:
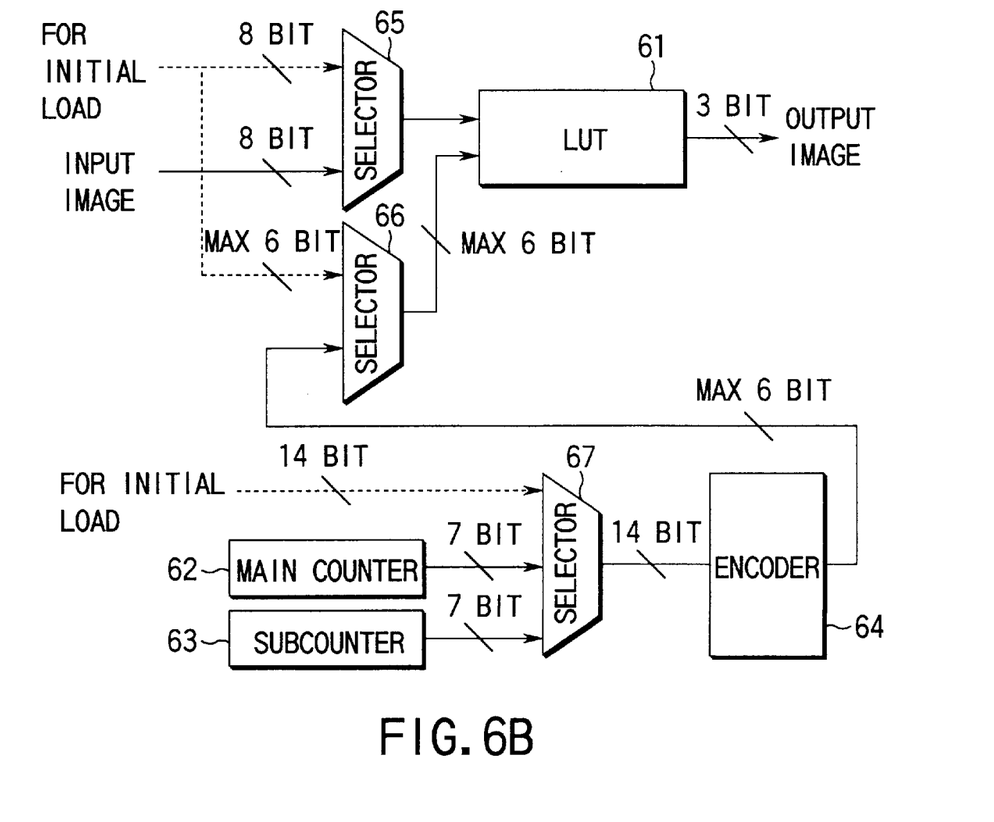

According to the aforementioned components, halftone from 3 bits and 8 gradients per pixel to 3 bits and 256 gradients per pixel can be realized by subjecting input image data of 8 bits and 256 gradients per pixel to multilevel dither processing. When the encoder 64 and LUT 61 are composed of a RAM shown in FIG. 6B, multilevel dither processing which is variable at will can be realized by initially loading a combination of dither basic threshold arrays illustrated in FIG. 7 or a combination of multilevel threshold arrays over planes illustrated in FIG. 8C, which combination is a content in the RAM, through respective selectors 65, 66 and 67 before the halftone processing.

The following will describe a specific example of multilevel dither processing.

As a basic dither matrix, an ordinary screw type of dither matrix having a screen angle of 45 degrees is used. In the present embodiment, the number of reproducible pseudo graduations is 8×(8−1)+1=57. As compared with actual gradients, it is a fewer. For simplification of explanation, however, this case will be described. Even if the gradients increase, a fundamental processing method, in the embodiment described below, which is according to the present invention never changes.

Figure 7A:
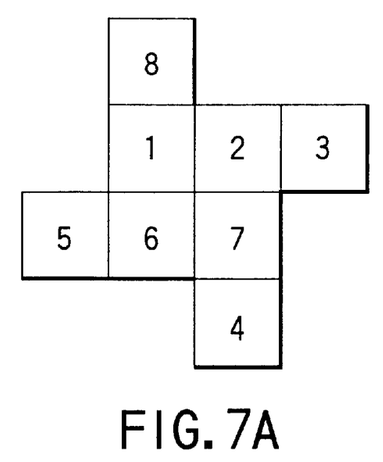
FIGS. 7A and 7B are a basic dither matrix and a matrix obtained by spreading the basic dither matrix into a square lattice, respectively.
Figure 7B:
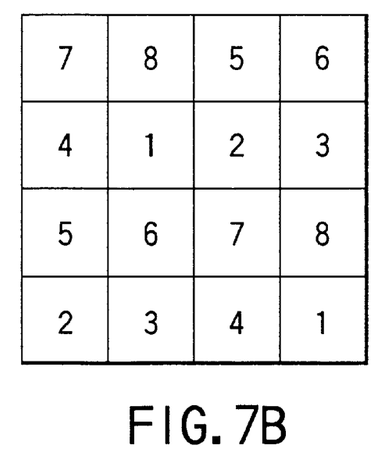

When a basic dither matrix shown in FIG. 7A is spread into a square lattice, the resultant is shown in FIG. 7B. The bit number of the main counter 62 and that of the subcounter 63 are 2 bits, respectively. Three bits of data obtained by encoding such data in the encoder 64 and input image data are subjected to multilevel dither processing in the LUT section 61, so as to output 3 bits of image data.

Figure 8A:
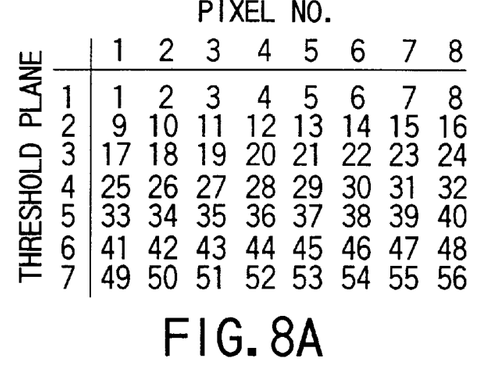
FIGS. 8A to 8C are view for explaining a conception of multilevel dither processing in the same embodiment.
Figure 8B:
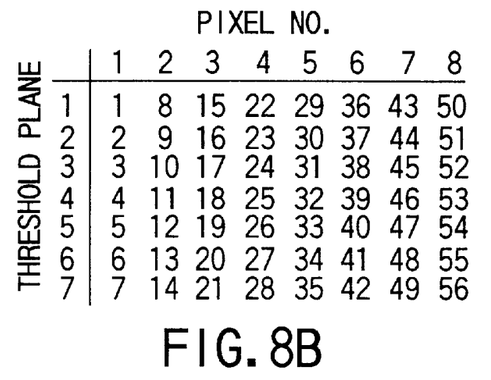
Figure 8C:
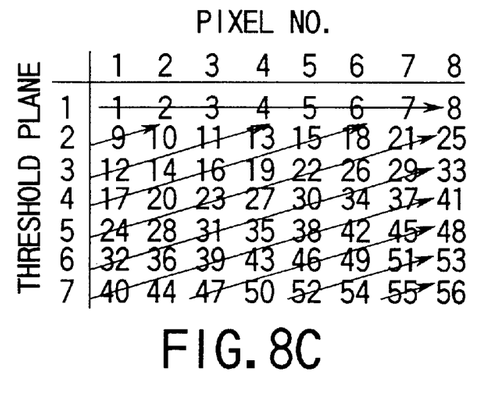

The thresholds in FIGS. 8A to 8C are 0 to 255, and are shown in simple, serial number order of the thresholds without being normalized. The pixel numbers correspond to the basic thresholds shown in FIG. 7A.

Using the multilevel dither thresholds composed of the respective threshold arrays in FIGS. 8A to 8C, dither processing is carried out, so that when the input image data corresponding to each position are larger than the threshold, the position will be into a dot-to-on state, and when the input image data corresponding to each position are smaller than the threshold, the position will be into a dot-to-off state. The threshold row in the threshold plane 1 corresponds to respective thresholds for on/off states of the first basic gradient dots shown in FIG. 5. The threshold row in the threshold plane 2 corresponds to respective thresholds for on/off states of the second basic gradient dots shown in FIG. 5. The same rule is applied correspondingly to the following. Thus, the threshold row in the threshold plane 7 corresponds to respective thresholds for on/off states of the seventh basic gradient dots (the largest dots) shown in FIG. 5.

FIG. 8A shows an example having the same threshold array arrangement as the conventional example shown in FIG. 17A. This is an ideal threshold array, but the image quality is liable to be influenced by printing accuracy, and thus density unevenness and vertical stripe arise. This is because an image is liable to be reproduced in the whole of a pixel by dots having the same or substantially the same sizes and, in consequence, when a gap from an ideal state is generated by influence by printing accuracy or the like, the gap becomes very visually conspicuous as deterioration of image quality.

Figure 9A:
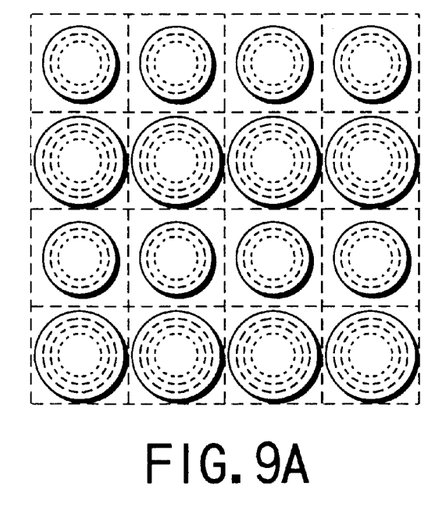
FIGS. 9A to 9C are views showing an example of a printed matter obtained by carrying out multilevel dither processing using the array shown in FIG. 8A, an example of a printed matter obtained by carrying out multilevel dither processing using the array shown in FIG. 8B, and an example of a printed matter obtained by carrying out multilevel dither processing using the array shown in FIG. 8C, respectively.
Figure 9B:
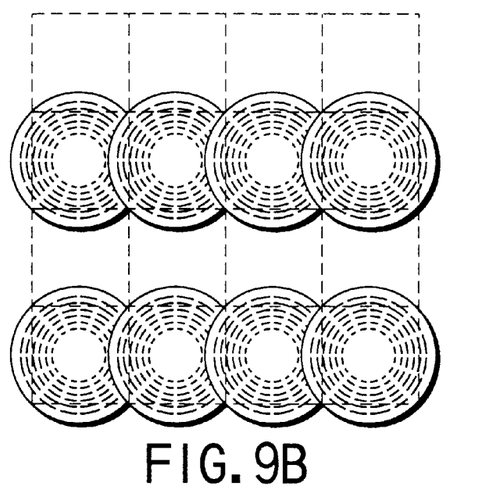

FIG. 8B shows an example having the same threshold array arrangement as the conventional example shown in FIG. 17B. The density unevenness and vertical stripes originating from accuracy of the printer engine do not become very conspicuous, but resolution drops. The threshold array arrangement shown in FIG. 8B, its output pattern is the same as bi-level dither matrices shown in FIG. 9B. Therefore one graduation is equal to be reproduced by pixels, the resolution contrary to graduation drops on the contrary as bi-level halftone processing. FIGS. 9A and 9B shows examples of printed matters which are based on a wholly uniform half tone of the $28^{th}$ gradient in the 57 gradients and are obtained by the multilevel dither processing according to the arrays shown in FIGS. 8A and 8B. when the basic dither matrix shown in FIG. 7B is used. FIG. 9A shows a printed matter according to the array shown in FIG. 8A. FIG. 9B shows a printed matter according to the array shown in FIG. 8B. As is evident from these resultant matters, these 2 types of dither processings result in extremely different outputs.

Figure 9C:
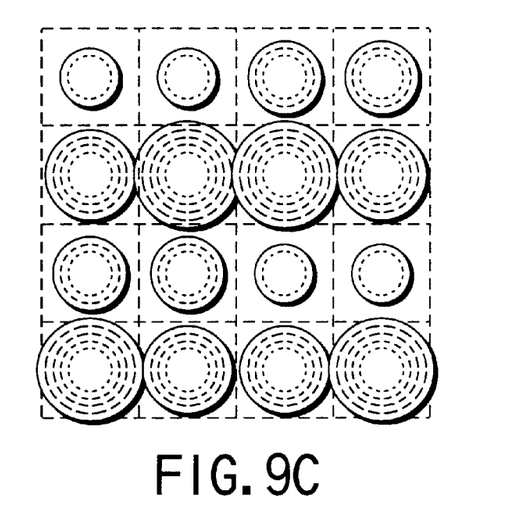

In the present embodiment, therefore, as shown in FIG. 8C, thresholds are applied in turn to a threshold array, in such a manner that the numbers of the thresholds are arranged in zigzags and obliquely to the pixel number (basic threshold) direction and the threshold plane direction. An example of dot output in the present embodiment is shown in FIG. 9C, correspondingly to the conventional examples of dot output shown in FIGS. 9A and 9B. The output character is a middle character between the characters shown in FIG. 9A and FIG. 9B. Difference between them is that an image is formed by dots having a larger number of sizes in the present embodiment. The dots having different sizes are dispersed for printing, resulting in forming an image resistant against density unevenness and stripes.

It is known that in an image reproduced from a 0 to 20% input image, the size of constituent pixels is smaller than the pitch interval of adjacent pixels, and in consequence density unevenness and vertical stripes are not conspicuous. Thus, for input images within this range, spatial frequency should be raised. The spatial frequency means a frequency character of printed dots arranged in a physical space.

In other words, a dither threshold array having the same arrangement as in FIG. 8A should be used. According to this manner, pixels do not become conspicuous in low density areas (that is, highlight areas), which are very important for graduation reproduction by printers, thereby improving graduation reproduction.

Besides, this dither threshold array is different from the array in which thresholds are arranged at random, and has regularity. Thus, so long as parameters, for example, an angle of the oblique direction and the starting position, are know, thresholds in respective planes can be automatically obtained from the basic dither matrix. Thus, the hardware can be made simple.

Figure 10:
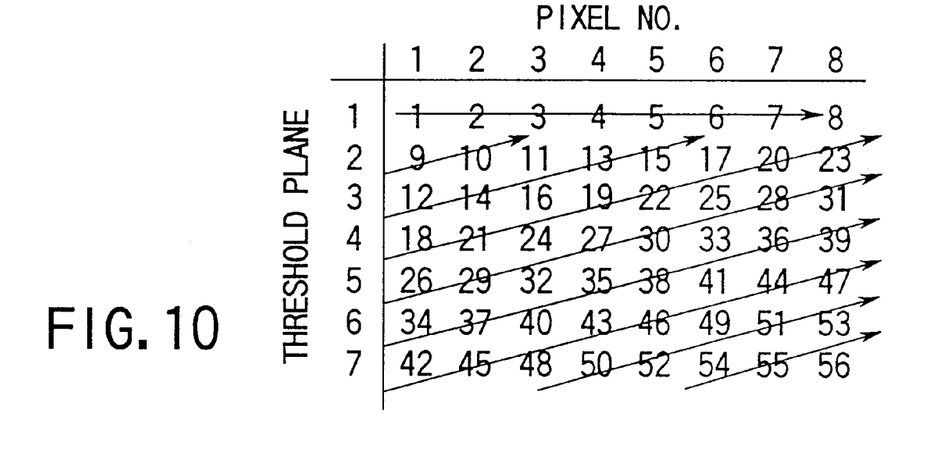
FIG. 10 is a view showing an example of a multilevel dither threshold array in the same embodiment.
Figure 11:
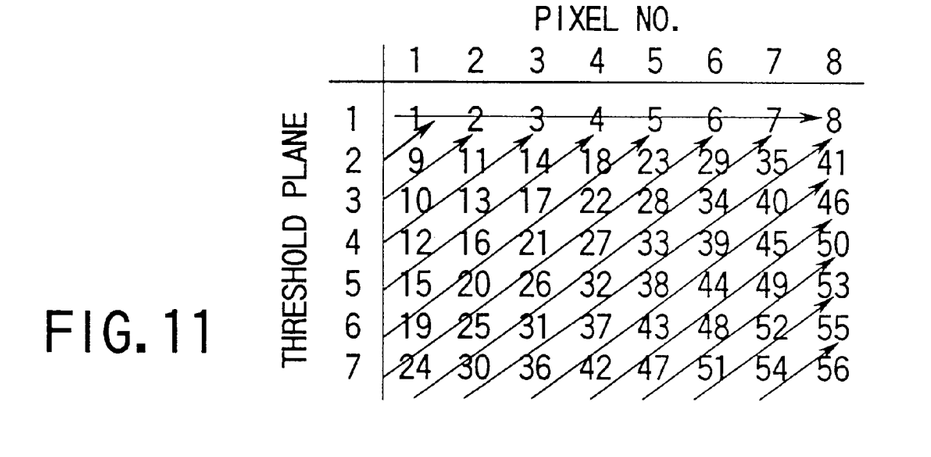
FIG. 11 is a view showing another example of a multilevel dither threshold array in the same embodiment.
Figure 12:
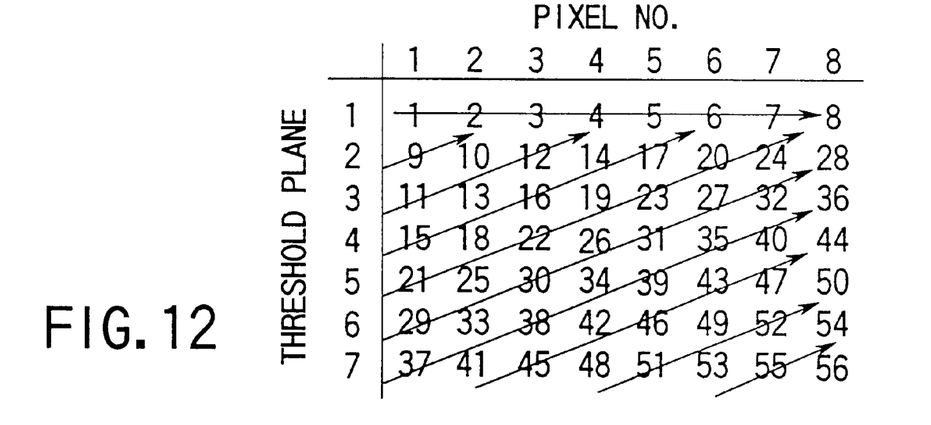
FIG. 12 is a view showing still another example of a multilevel dither threshold array in the same embodiment.
Figure 13A:
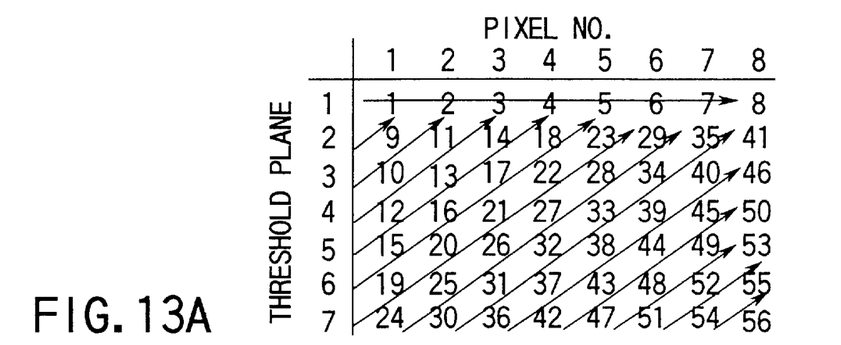
FIGS. 13A to 13D are views showing examples of a multilevel dither threshold array in case of color printing, in the same embodiment.
Figure 13B:
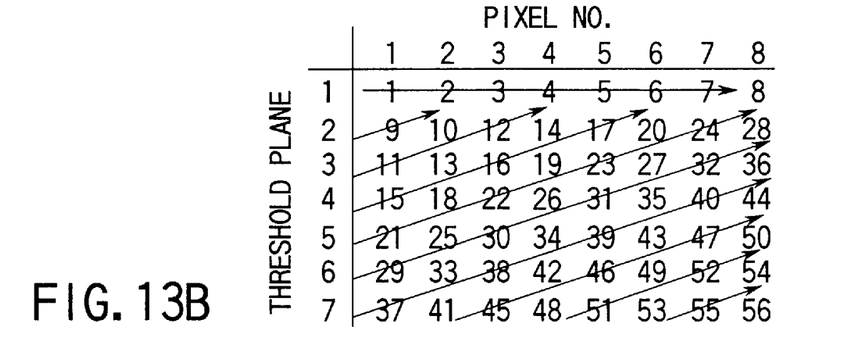
Figure 13C:
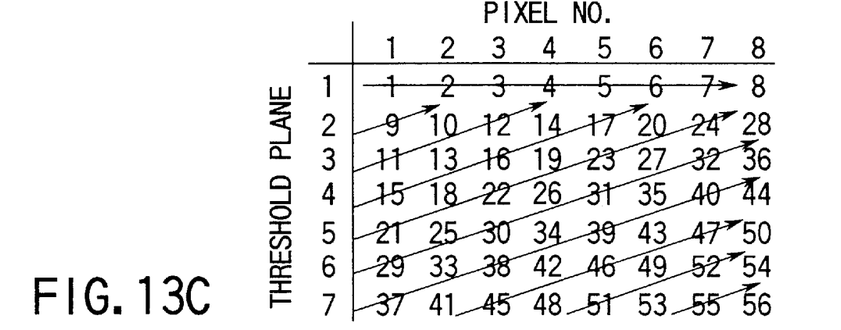
Figure 13D:
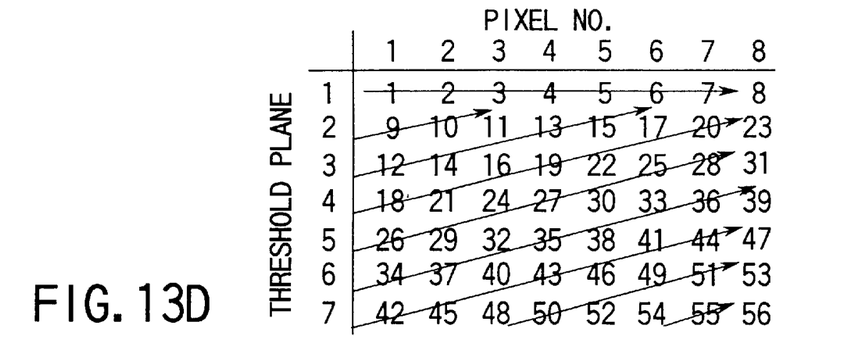

As a manner of applying thresholds to a threshold array in an oblique direction, various types can be adopted. FIGS. 10, 11 and 12 show examples of multilevel dither threshold arrays having 3 different types of oblique angles. FIG. 10 shows an example of a threshold array in which the angle with the horizontality is smallest among the 3 types of FIGS. 10, 11 and 12. In this case, the spatial frequency becomes high but density unevenness of images and vertical stripes become conspicuous. This is because an image is liable to be reproduced in the whole of a pixel by dots having the same or substantially the same sizes and, in consequence, when a gap from an ideal state is generated by influence by printing accuracy or the like, the gap becomes very visually conspicuous as deterioration of image quality. If, in this threshold array, the angle with the horizontality becomes 0 degree, this becomes equal to the array shown in FIG. 8A.

FIG. 11 shows an example of a threshold array in which the angle with the horizontality is largest among the 3 types of FIGS. 10, 11 and 12. In this case, images are formed with a tendency towards a drop in resolution, but density unevenness of images and vertical stripes can be prevented. If, in this threshold array, the angle with the horizontality becomes 90 degree, this becomes equal to the array shown in FIG. 8B. FIG. 12 shows an example in which the angle with horizontality is set between those in FIG. 10 and FIG. 11. In this case, output characteristics is between output characteristics of FIG. 10 and its of FIG. 11 density unevenness of images and vertical stripes can be prevented to some extent, and resolution also be kept to some degree.

Thus, when the angle with the horizontality in multilevel dither threshold arrays is set optimally in light of density unevenness originating from printing accuracy and the degree of vertical stripes, image can be formed with the maximum resolution, whereby density unevenness and vertical stripes are not conspicuous. A multilevel dither threshold array which is optimal for accuracy of a printer engine is set in such a manner that, for example, when a gap distance between the center position of a dot to be printed and the central position of an actual dot is ±5 μm, the angle with the horizontality is smaller as shown in FIG. 10, and when the same gap distance is ±10 μm and printing accuracy deteriorates, the angle with the horizontality is larger as shown in FIG. 11. Then halftone processing is carried out using such arrays. In short, use of the multilevel dither threshold array shown in FIG. 11 permits resolution to be lowered, and makes lines and density unevenness inconspicuous, and further does not permit unnecessary drop in substantial resolution.

In case of color images, multilevel dither processing is carried out for each of the colors. In general, the multilevel dither processing is performed with different screen angles for each of the colors, in order to suppress color unevenness resulting from printing accuracy. As is known in the art, the conspicuousness of the density unevenness and vertical stripes depends on the color of the image of the printing accuracy is the same, the density unevenness and the stripes appear most conspicuous in a black image, less conspicuous in a magenta image, still less conspicuous in a cyan image, and less 8 conspicuous in a yellow image.

Thus, in case of color images, in multilevel dither processing for each color, more appropriate output images can be obtained by performing halftone processing while appropriately altering the degree of the inclination in threshold arrays for the respective colors. FIG. 13 shows threshold arrays for respective colors in multilevel dither processing of color images with certain printing accuracy. FIGS. 13A, 13B, 13C and 13D show a threshold array for black (K), a threshold array for magenta (M), a threshold array for cyan (C), and a threshold array for yellow (Y), respectively.

The order of increasing inclinations, that is, of angels nearer 90 degrees is Y<C=M<K. In this example, the same threshold array is used for M and C. The angle of dither threshold rows with the horizontality for each color is decided in such a manner that images can be formed with the maximum resolution for each color, resulting in making density unevenness and vertical stripes inconspicuous.

Figure 14:
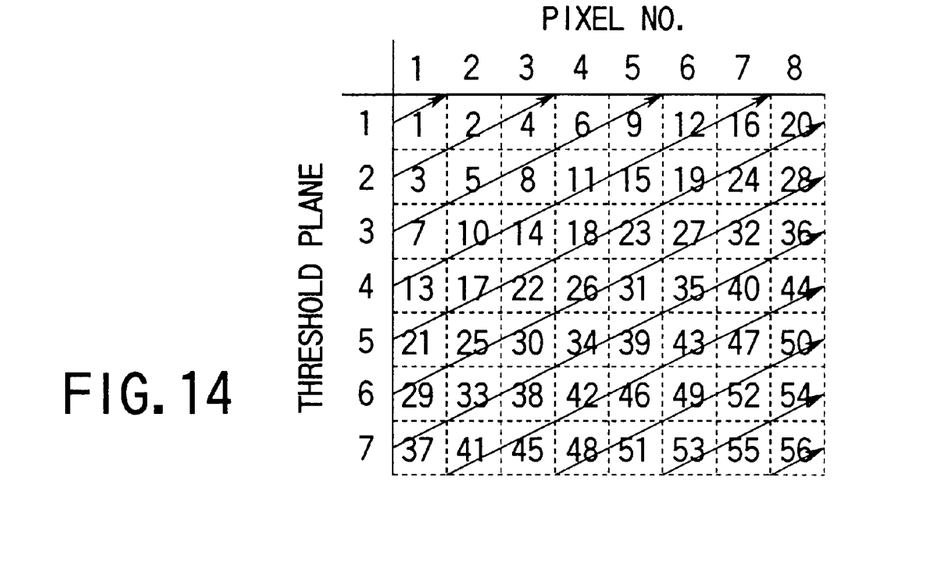
FIG. 14 is a view showing an example of a multilevel dither threshold array in the same embodiment.

In this way, whether images are monochrome or color images, it is possible to suppress influence by density unevenness originating from printing accuracy, lengthwise lines and the like with keeping resolution at a limit level by setting a multilevel dither threshold array so as to match the printing accuracy. Besides, in highlight areas of images, apparent graininess in the highlight areas can be suppressed by using a threshold array in which the spatial frequency is raised still more. In low density areas, in which discrete dot arrangement is generally liable to give the impression of graininess to the sense of sight, it is preferred to use a threshold array having a higher spatial frequency than high density areas. However, when printing accuracy is too bad, the diameter of basic dots constituting low density areas is larger, or density unevenness and stripes are conspicuous even in low density areas in case of some color, it is permissible to use a threshold array wherein its whole density areas are of zigzag scanning type as shown in FIG. 14, without using the array wherein the spatial frequency in the low density portion is raised. In this case, substantial resolution of images reproduced in the whole density areas becomes equal. The graininess of the whole of the images deteriorates, but correction effect against density unevenness and stripes is improved still more.

As described above, by keeping a multilevel dither threshold array matching printing accuracy, resolution is lowered and further the printing unevenness arising on fine areas is canceled. Thus, stripes and density unevenness can be made inconspicuous. In addition, it is possible to prevent substantial resolution from dropping to a larger extent than needed.

The basic dither matrix to which a multilevel dither threshold array is applied may be basically made into any form. However, as is known, for example in case of vertical stripes, when the direction of influence on images is known in advance, it is most effective to use a threshold array causing pixels to grow in the direction perpendicular to this influence direction. (In case of vertical stripes, a basic dither pattern causing pixels to grow in the lateral direction is used as shown by the basic dither matrix in FIG. 7)

The present embodiment was described, giving, as an example, a case wherein, for respective pixels, color image data of 8 bits and 256 gradients are subjected to halftone processing so as to output data of 3 bits and 8 gradients for each color. However, the present invention is not necessarily limited to this example. The present invention can be applied to cases of any number of input gradients and any number of output gradients. Parameters including the pattern size, arrangement, the depth of the multilevel in a basic dither matrix are not limited to those in the present embodiment, and can be set at will, in the light of balance between resolution and graduation. Furthermore, a cluster may be introduced.

The present embodiment is an embodiment in which the present invention is applied to a color ink jet printer, but the present invention is not necessarily limited to such embodiments. Thus, the present invention can be applied to a monochrome ink jet printer, a thermal printer, an LED printer and the like.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

I claim:

1. An image processing method, comprising the step of subjecting input graduation image data of M bits per pixel to multilevel dither processing on the basis of plural dither threshold planes, so as to convert them into image data of N (M>N) bits per pixels, having a smaller number of gradients, in which, in a dither threshold array between basic thresholds of a dither matrix and the plural dither threshold planes, dither thresholds therein are in sequence and regularly arranged with an inclination having an oblique angle, so as to extend over the plural dither threshold planes.

2. The image processing method according to claim 1, wherein the inclination having the oblique angle is changed according to printing accuracy.

3. An image processing method, comprising the step of subjecting input graduation image data of M bits per pixel to multilevel dither processing on the basis of plural dither threshold planes, so as to convert them into image data of N (M>N) bits per pixels, having a smaller number of gradients, in which, in a dither threshold array between basic thresholds of a dither matrix and the plural dither threshold planes, in low density areas of the input graduation data dither thresholds therein are regularly arranged with an inclination for raising spatial frequency, and in half tone areas and high density areas of the input graduation data dither thresholds therein are regularly arranged with an inclination for making spatial frequency lower than that of the low density areas.

4. The image processing method according to claim 3, wherein in the half tone areas and the high density areas of the input graduation data the inclination for arranging the dither thresholds are changed according to printing accuracy.

5. An image processing method, comprising the step of subjecting input color graduation image data of M bits per pixel to multilevel dither processing on the basis of plural dither threshold planes, so as to convert them into color image data of N (M>N) bits per pixels, having a smaller number of gradients, in which, in a dither threshold array between basic thresholds of a dither matrix and the plural dither threshold planes, dither thresholds therein are in sequence and regularly arranged with an inclination having an oblique angle, so as to extend over the plural dither threshold planes, and in addition the inclination for arranging the dither thresholds are changed according to each of colors of cyan, magenta, yellow and black.

6. An image processing method, comprising the step of subjecting input color graduation image data of M bits per pixel to multilevel dither processing on the basis of plural dither threshold planes, so as to convert them into color image data of N (M>N) bits per pixels, having a smaller number of gradients, in which, in a dither threshold array between basic thresholds of a dither matrix and the plural dither threshold planes, in low density areas of the input color graduation data dither thresholds therein are regularly arranged with an inclination for raising spatial frequency, and in half tone areas and high density areas of the input color graduation data dither thresholds therein are regularly arranged with an inclination for making spatial frequency lower than that of the low density areas, and in addition the inclination for arranging the dither thresholds are changed so as to change the spatial frequency according to each of colors of cyan, magenta, yellow and black.

7. A printer, comprising:
a processing means wherein, when subjecting input graduation image data of M bits per pixel to multilevel dither processing on the basis of plural dither threshold planes, so as to convert them into image data of N (M>N) bits per pixels, having a smaller number of gradients, in a dither threshold array between basic thresholds of a dither matrix and the plural dither threshold planes, dither thresholds therein are in sequence and regularly arranged with an inclination having an oblique angle, so as to extend over the plural dither threshold planes; and
a printing means for printing on the basis of the image data of N bits outputted from the image processing means.

* * * * *